United States Patent [19]

Samuelson

[11] Patent Number: 4,858,120

[45] Date of Patent: Aug. 15, 1989

[54] SYSTEM FOR REGULATING ARRIVALS OF CUSTOMERS TO SERVERS

[75] Inventor: Douglas A. Samuelson, Reston, Va.

[73] Assignee: International Telesystems Corp., Herndon, Va.

[21] Appl. No.: 27,359

[22] Filed: Mar. 18, 1987

[51] Int. Cl.$^4$ .............................................. G06F 15/36
[52] U.S. Cl. ................................... 364/401; 379/113; 379/309
[58] Field of Search .................... 340/286 R; 379/113, 379/266, 309, 92, 69; 364/401, 436

[56] References Cited

U.S. PATENT DOCUMENTS

| | | | |
|---|---|---|---|
| 3,803,578 | 4/1974 | LaVanway | 340/286 |
| 3,808,410 | 4/1974 | Schlesinger | 364/401 |
| 3,921,160 | 11/1975 | Ratner | 340/286 R |
| 4,001,508 | 1/1977 | Johnson | 379/69 |
| 4,048,452 | 9/1977 | Oehring | 379/113 |
| 4,398,257 | 8/1983 | Paganini | 340/286 R X |
| 4,408,100 | 10/1983 | Pritz | 379/113 X |
| 4,670,844 | 6/1987 | Lach | 364/436 |
| 4,700,295 | 10/1987 | Katsof | 340/286 R X |

*Primary Examiner*—Jerry Smith
*Assistant Examiner*—Steven G. Kibby
*Attorney, Agent, or Firm*—Whitham and Marhoefer

[57] ABSTRACT

A method for controlling arrivals to servers, comprising: regulating arrivals, by initiating a processor generating arrivals or by re-routing or turning away arrivals; measuring durations of service; computing and updating time statistics, including mean, minimum, maximum expected and standard deviation of duration of service thereby estimating expected duration of service; measuring transit times from the point of regulating arrivals to start of service and thereby estimating expected transit times; measuring a ratio of numbers of service initiations to numbers of arrivals at the point of regulating arrivals; recording starting time of each current service; noting present time; comparing present time to starting time, and thereby determining time in progress for each service; comparing time in progress to expected duration of service, and estimating time remaining in service for each customer currently in service; comparing estimated time remaining in service to estimated transit time from the point of regulating arrivals to the start of service, determining a number of currently busy servers expected to be available by the time another arrival could reach them; measuring the number of available servers not currently serving; adding the number of currently available servers and the number of currently busy servers expected to be available and thereby computing total number of servers expected to be available; subtracting the number of arrivals currently queued awaiting service thereby producing a resultant number of servers expected to be available; and controlling a means for regulating arrivals to correspond to the resultant number of servers expected to be available.

20 Claims, 7 Drawing Sheets

OPEN NETWORK

FIG. 2 CLOSED NETWORK

MULTIPLE-LOOP CLOSED NETWORK

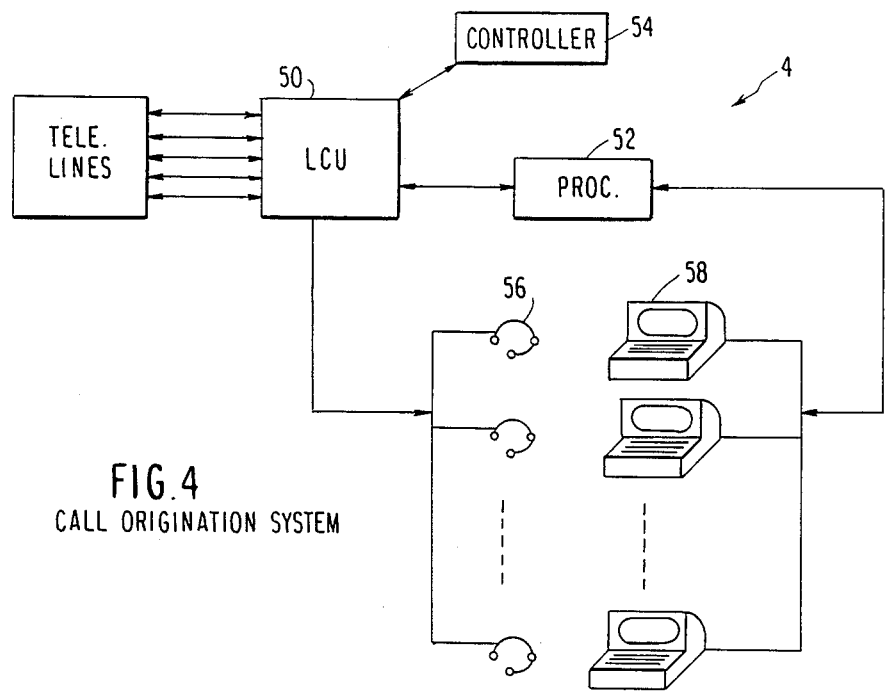
FIG.4
CALL ORIGINATION SYSTEM
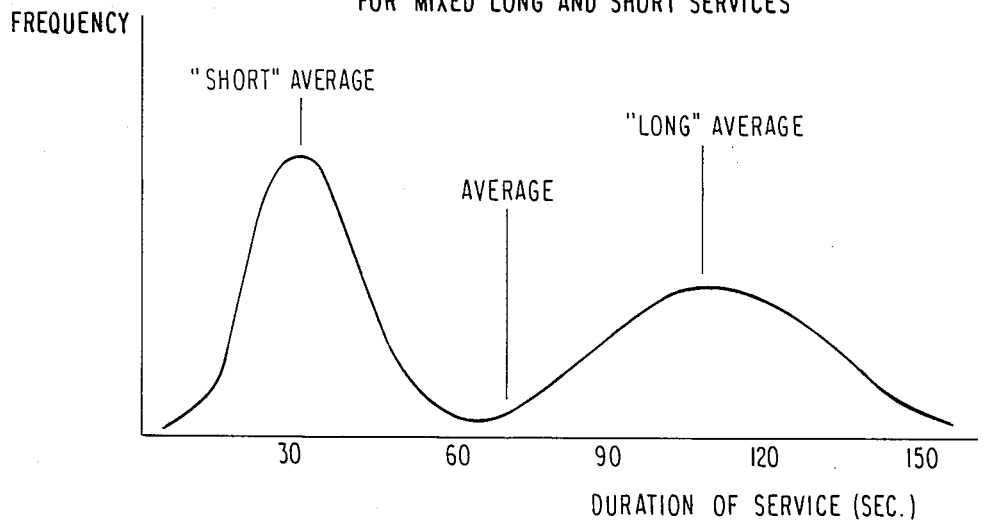
FIG.5 FREQUENCY DISTRIBUTION OF DURATION OF SERVICE FOR MIXED LONG AND SHORT SERVICES

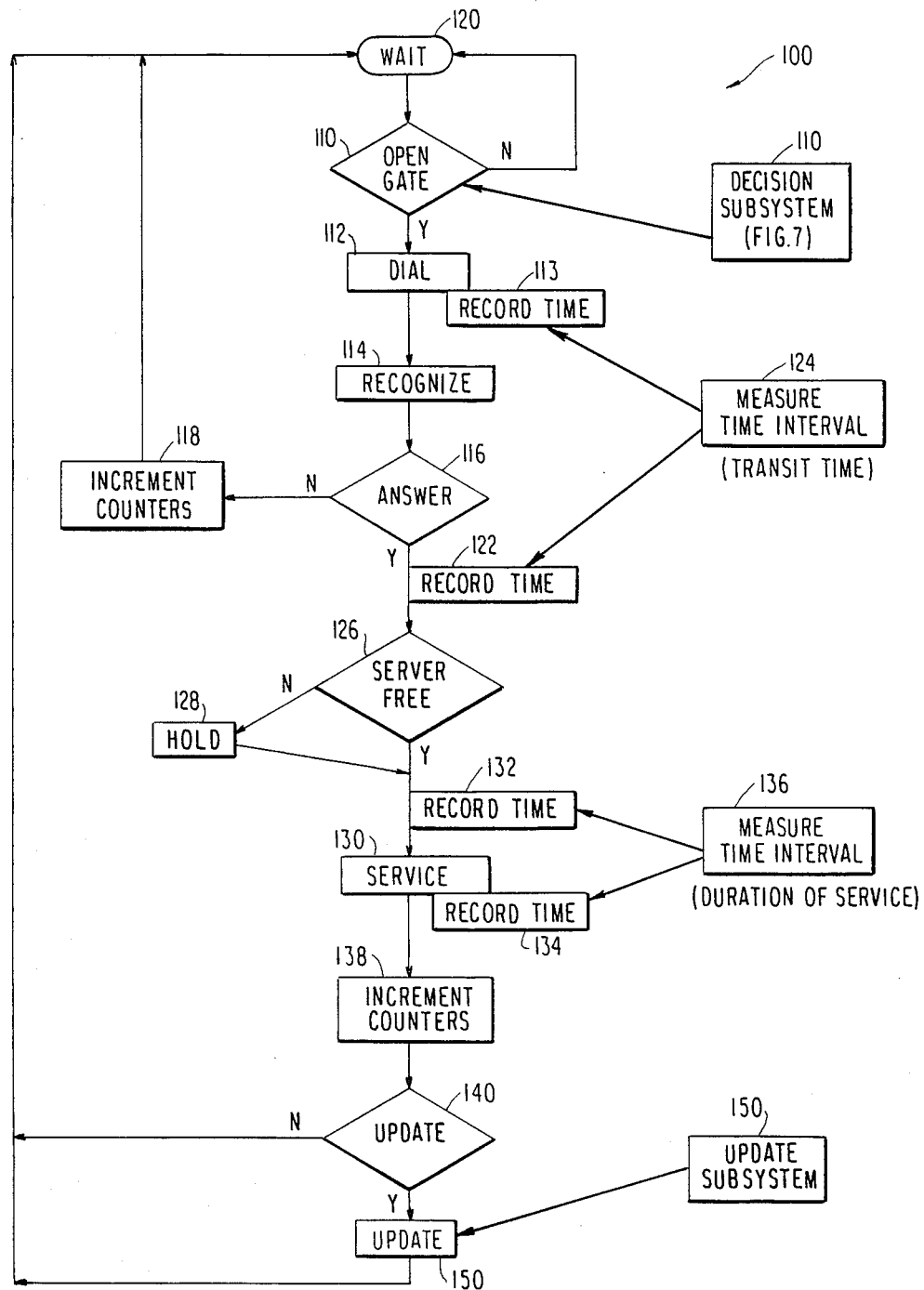
FIG.6 CALL ORIGINATION SYSTEM CONTROL STEPS

DECISION SUBSYSTEM

COMPUTE SUBSYSTEM

SYSTEM FOR REGULATING ARRIVALS OF CUSTOMERS TO SERVERS

BACKGROUND OF THE INVENTION

This invention concerns regulating arrivals, taking into account the availability of servers to serve the arrivals. The servers can be literally persons, things, or routes, either fixed or transitory.

Most systems currently in use regulate the rate of arrivals by occasionally varying a time interval between admissions of arrivals, or between initiations of a process generating arrivals. To the extent that systems currently in use take account of recent experience, especially servers' activity, they do so only via average service times and counts, or rates, of traffic past certain points. For a long time, a need has existed to control arrivals in a way directly interrelated to availability of servers. The need continues and is intensified by the development of high-speed communications networks, in which close interrelation of arrivals and availability of servers greatly affects efficiency and performance.

The need is especially apparent in, for example, call origination management systems, wherein arrivals (answering patrons) are generated by dialing one or more telephone lines, and servers are operators who talk to answering patrons. The need also exists to provide substantial improvements in call-routing control methods and systems currently used in some inbound telephone systems, such as Automatic Call Distributors; telephone company switching equipment; and computer-directed telecommunications networks. A further need exists to improve methods and systems currently used in traffic flow control and routing control systems; systems to manage perishable inventory; systems to control routing of repairable items to alternative maintenance facilities; and other systems wherein the objective is to make most efficient use of servers without imposing long waiting times, or non-availability of servers, on arriving customers.

SUMMARY OF THE INVENTION

This invention provides an improved means for regulating arrivals to a system, mechanism or network with one or more servers, where arrivals occur with some randomness.

This invention provides and utilizes a sophisticated estimate of expected service time remaining. It also computes the average transit time from initiation admitting arrivals, or initiation of a process generating arrivals, to beginning of service, based on its most recent experience. The system not only takes average service times into account but also collects and utilizes other data on the statistical distribution of service times: maximum, minimum, proportion of "long" and "short" services, and mean and variance of both "long" and "short" service times. It has the ability to recognize when durations of service cluster into two groups of values. For example, for the call origination system, service may be 1.5 to 3 minutes for the person an operator wanted to talk to, but only 20 to 30 seconds to leave a message if the desired contact is not available. The system collects statistics on both groups of values and computes the probability that a given (current) service is a long service, based on how long the service has been in progress already.

The system also varies the number of arrivals admitted or processes initiated to generate arrivals, depending on the probability that such an admission or initiation will result in a customer entering service, when not all such admissions or initiations have such a result. This probability, like the expected service times, is updated continuously, so the decisions regulating arrivals are always based on current information about the system's situation. In this way, the system makes best use of its information to utilize its resources most effectively, maximizing productivity.

The system includes several new features unique to control processes of this type. First, it collects and updates information about the system's status and performance continuously and instantaneously, so it always bases its decisions regulating arrivals on current data. Second, it takes into account all relevant information about the system's status and operation, including characteristics of the arrivals and of servers, to maximize the rate at which customers arrive to servers. The system takes into account the typical differences between "long" and "short" classes of customers which require significantly different service times. Third, the system preferably incorporates two or more different settings that give a supervisor the ability to select the desired performance characteristics. In particular, the system can be controlled, either by the supervisor or automatically, to maximize the rate of service completions within a constraint on the probability of generating an arrival for which no server will be available. Fourth, by making more efficient use of resources, the systems increases overall throughput as well as service throughput. Fifth, the system improves configuration planning by making it possible to estimate very accurately what resources (in particular, number of servers, such as operators, versus number of processes generating arrivals, such as telephone lines) will best achieve desired levels of performance.

The present invention, in one preferred embodiment, incorporates five different systems representing different "trade-offs" between speed and non-availability of servers. These systems are incorporated into the control of integrated network mechanisms. The supervisor operating the mechanism can choose among these systems by entering a control command. In all cases, the basic principle is to predict how long a busy server is likely to remain busy, and how long the mechanism is expected to take to process a new arrival so that the arrival will be ready for the server as the server becomes available. In call origination management systems, for example, the processing time for arrivals (answered calls) is the time from dialing to answer. The system causes the mechanism to begin a process, (to dial, for example) when the time a busy server is expected to remain busy is less than the expected transit time from admission to service (for example, the time from start of dialing to answer, if the dialing attempt results in an answer.) The system may begin more than one process per server if each process is unlikely to require a server; for example, the call origination management system may dial more than one line for each server expected to be available, to reflect the likelihood of *not* getting answers on every dialing attempt.

In the preferred call origination management system, the systems incorporated into the control are:

System 1 (fastest): The system counts "1" for every server who is not busy and "1" for every server whose expected remaining service time, estimated as the difference between the elapsed time and the *minimum* service time encountered in the last ten minutes, is less than the average time from admission or initiation of arrival (for example, dialing start) to commencement of service. This count is called "k". The system initiates k/p arrival-generating processes (dials k/p lines), where p is the number of customers entering service (answers) in the last ten minutes divided by the number of arrival initiations (dialing attempts) in the last ten minutes. In one example, the call management mechanism has 7 servers, 3 of them are idle, 2 have just begun service, and 2 have been in service for close to the shortest service time we had observed, and 50% of recent dialing attempts have resulted in answers. For this example, the system computes k=3+2=5, and k/p=5/.5=10. Therefore, ten lines are dialed.

System 2 ("short-long"): The system counts "k", the number of servers expected to be available, as in system 1. Expected availability for busy servers is computed based on "long" versus "short" service times, taking into account the bimodal frequency distribution of service times which is typical for call origination systems. In one preferred embodiment, the service in progress is expected to be "long" if it has lasted longer than the mean plus one standard deviation of "short" service times in the last ten minutes of operation. (The standard deviation is the square root of the sum of squared deviations from the mean.) In another preferred embodiment, the mean plus two standard deviations of "short" service times encountered in the last ten minutes is used as the dividing point between expected "short" and expected "long" service times. The system predicts that a server currently busy is in a short service unless the time that customer has already been in service exceeds the sum of the mean short service time plus one (or two, as selected) standard deviations of the short service time. The system uses the mean (average) "long" service time minus one standard deviation of "long" service times to estimate duration of "long" services, and halfway between the minimum and mean "short" service time to estimate duration of other services. The system then computes k/p, number of arrivals to admit (lines to dial), as in System 1.

System 3 ("standard"): The system predicts and counts "k", initiates k/p arrivals (dials k/p lines), and defines "long" services as in System 2, but uses mean (average) "long" service time as estimate of duration of "long" and mean "short" service time as estimate of duration of other services.

System 4 ("conservative"): System 4 is similar to System 2, but uses *grand mean* service time as an estimate of duration of services not identified as "long" services. The grand mean (average service time for all services) is:

(proportion short services)×(mean short service time)+(proportion long services)×(mean long service time).

The proportion of short services is the number of short services in the last ten minutes of operation divided by the total number of services in the same time interval. The proportion of long services is computed similarly. (Of course, the two proportions sum to unity.)

System 5 ("virtually no risk of unserved customers"): The system counts "k" servers expected to be available, as in Systems 2 through 4, and initiates *only* k arrival processes (dials only k lines.) System 5 uses the "historical" maximum service time (definition follows) as the estimated duration for *all* services. Whenever a service time exceeds the "historical" maximum, the system updates the "historical" maximum to the new value immediately. Whenever the maximum service time in the last ten minutes (or 50 services, whichever occurs later) is less than the historical maximum, the system updates the historical maximum, using a smoothed average of the historical and ten-minute maxima, as in the formula:

$$mn=(r)(mo)+(1-r)(mt),$$

where
mn is the new historical maximum,
mo is the old historical maximum,
mt is the maximum in the last ten minutes, and
r is a smoothing constant between 0 and 1.

In one current preferred embodiment, r=0.7. In another, more conservative embodiment, r=0.9. In the most conservative embodiment, r=1.0, which means the longest service time *ever* encountered is used from then on as the historical maximum. In the most changeable embodiment, r=0.0, which means that service times prior to the last ten minutes of operation are no longer considered in determining the historical maximum.

System 6 (System 2 with hold message): In this preferred embodiment, the call management mechanism has the capability to connect an answering patron to a means for playing a recorded message asking the patron to hold for a live operator, and to transfer patrons on hold to live operators as soon as an operator is available. The system counts k, the number of servers (operators) expected to be available, as in System 2, but also counts m, the number of patrons on hold. The system then dials (k−m)/p lines, where p is defined as in System 1.

System 7 (System 1 with "front" and "back" service): In this preferred embodiment, the call management mechanism has the capability to connect an answering patron to a live operator; transfer the patron, at the operator's control command, to a means for playing a recorded message to the patron; and connect the patron to the same of another live operator at the conclusion of the message. The system computes k, the number of servers (operators) expected to be available, as in System 1, but also counts j, the number of patrons listening to recorded messages. The system then dials (k−j)/p lines, where p is defined as in System 1.

A preferred system for controlling arrivals to servers regulates arrivals by initiating a process which generates arrivals or by turning away or re-routing arrivals. The system measures times of service and computes and updates time statistics. Measurements include mean or average times, standard deviations, and minimum and maximum times of service. The system measures transit times from the point of regulation of arrivals to the start of service; measures the ratio of numbers of service initiations to numbers of actual and/or potential arrivals at the point of regulation of arrivals; records start of each current service; notes the present time; and compares present time to starting time and determines the time in progress for each service. Comparing time in progress to a measure of expected time in service, the system uses this comparison to estimate time remaining in service for each customer currently in service. The system then compares computed or estimated time remaining in service to measured or estimated transit time from the point of regulation of arrivals to the start of service and thus determines number of servers expected to be available by the time another arrival could reach them. The system measures numbers of available servers not currently serving, adds numbers of available servers currently busy but expected to be available shortly, to compute the total number of servers expected to be available. From this result, the system subtracts the number of customers currently queued awaiting service. Using this calculation, the system regulates the initiation or admission of arrivals to correspond to the number of servers expected to be available.

One preferred system arranges the number of arrivals initiated or admitted to equal the number of servers expected to be available, divided by the measured ratio of actual service initiations divided by the number of such attempts at initiations or admissions of arrivals, during a selected time interval of recent operation.

In another preferred system, the number of initiations or admissions of arrivals is a weighted average of the number of servers expected to be available, and the number of servers expected to be available divided by the ratio of service initiations divided by the number of arrival initiations or admissions.

In one preferred embodiment, which includes the calculation of arrivals based on number of servers expected to be available, as above, the expected duration of service is the measured minimum duration of service during a selected recent time interval of operation.

In another preferred embodiment, the expected duration of service is the measured maximum duration of service during a selected recent time interval of operation.

In another preferred embodiment, the expected duration of service is the mean (average) of durations of service during a selected recent time interval of operation.

In the preferred system, estimating expected duration of service further includes classifying service times as short or long; measuring mean, standard deviation, minimum, maximum, and other statistics of short service times; and measuring mean, standard deviation, minimum, maximum, and other statistics of long service times. The system uses the mean of the short service times as an estimate of the duration of short services, uses the mean of the long service times as an estimate of the duration of long services, and uses a weighted average of the means of the short and long service times as an estimate of the boundary between long and short services. The system classifies services which have been in progress longer than said estimate as long services, and others as short services. The estimated long service time is used as the expected duration of service for services currently in progress which are classified as long services, and the estimated short service time is used as the expected duration of service for services currently in progress which are classified as short services.

Preferably a weighted average of the maximum short service time and the minimum long service time is used as an estimate of the boundary between long and short service times.

In another embodiment, the mean plus S standard deviations of the short service times is used as an estimate of the boundary between long and short service times: S could be any positive number. In preferred embodiments, S is 1 or 2.

In another embodiment, the mean minus T standard deviations of the long service times is used as an estimate of the boundary between long and short service times: T could be any positive number. In preferred embodiments, T is 1 or 2.

Preferably the system uses the mean, minimum, maximum, standard deviation, order statistics, quantiles, or other statistics of the short service time, or any arithmetical combination of any or all of the said statistics of the short service times, as an estimate of the duration of short services.

Preferably the system uses the mean, minimum, maximum, standard deviation, order statistics, quantiles, and/or other statistics of the long service time, or any arithmetical combination of any or all of the said statistics of the long service times, as an estimate of the duration of long services.

Preferably the system uses the mean, minimum, maximum, standard deviation, order statistics, quantiles, and/or other statistics of the long and short service times, or any arithmetical combination thereof, as the estimate of the boundary between long and short services. The system classifies services which have been in progress longer than said estimate as long services, and others as short services.

The system may use the minimum of all service times as the estimate of duration of short services, or of all services.

The system may use the maximum of all service times as the estimate of duration of all services.

The system may use the mean (average) of *all* service times as the estimate of duration of short services, or of all services.

Another preferred system computes mean, minimum, maximum, and standard deviation of duration of service for each server, and estimates time remaining in service using the statistics for the individual servers in addition to the statistics for the servers as a group.

The system may use shrinkage estimators such as James-Stein estimators to incorporate both group and individual servers' recent experience into computed estimates of expected duration of service.

In one embodiment wherein customers may return to servers for subsequent stages of service, further comprising counting the number of customers having completed service but available (still within the system) to return to a subsequent stage of service, and subtracting the number of customers having completed service but expected to return to a subsequent stage of service from the total number of servers expected to be available, to regulate arrivals so as to ensure availability of servers for customers returning to service.

Another embodiment of the invention computes the estimated proportion of customers having completed one stage of service who are expected to return for subsequent service, and subtracting said estimated proportion, rather than the total number of customers having completed service and available to return to a subsequent stage of service, from the total number of servers expected to be available, to regulate arrivals.

A preferred system permits a supervisor to select, via a control command, among two or more of the preferred systems as described above.

Another preferred system counts the number of customers waiting for service and selects automatically among two or more subsystems using different statistical measures of duration of service, transit times from a point of regulation of arrivals to start of service, and proportion of arrivals entering service, so as to slow arrivals when more customers are waiting.

A preferred system collects data as above and adjusts automatically to provide a specified proportion, q, of arrivals for which no service is available. The system measures or computes mean, standard deviation, minimum, maximum, quantiles and other statistics of service times. The system classifies service times into long and short and computes the quantile or statistic, which may be any or all of the measured or computed statistics of service times, or any arithmetical combination thereof, such that the proportion q0 of service times less than said quantile or statistic is equal to the pre-selected proportion q, and uses the said quantile or statistic as the estimate of duration of service.

A preferred system further iteratively adjusts expected duration of service, d, to maintain a pre-selected proportion q of arrivals for which no server is available. This embodiment uses any statistic of service times as an initial estimate, $d=d1$, of the duration of service; decreases d to $d2=0.9d1$ if the resulting proportion of arrivals for which no server is available is higher than q; increases d to $d2=1.1d1$ If the resulting proportion of arrivals q1 for which no server is available is lower than q; and computes $$dnp1 = dn + (q-qn)(dn-dnm1)/(qn-qnm1)$$

at each step, where q is the desired proportion of arrivals for which no server is available;
dnp1 is the new calculated d, the estimated duration of service;
dn is the most recently used estimate of d;
dnm1 is the next most recently used estimate of d;
qn is the proportion of arrivals for which no server was available when dn was used as the estimate of d; and
qnm1 is the proportion of arrivals for which no server was available when dnm1 was used as the estimate of d.

Preferably, in the above system, the supervisor can change q at any time by entering a control command.

In a preferred system, the network or mechanism to be controlled has two or more sub-mechanisms or components, one or more of which regulates arrivals and/or routing to other components of the mechanism or network by means of one or more of said systems. Such a preferred system may include switching admitted arrivals, or processes or means generating arrivals, among two or more subsystems, depending on the predicted availability of servers for each of the plurality of subsystems.

In one preferred embodiment, the network or mechanism to be controlled is a call origination system or call management system.

In one preferred embodiment, the network or mechanism to be controlled is an automatic call distribution system, or a telephone switching device for distributing and/or routing incoming calls.

In one preferred embodiment, the network of mechanism to be controlled is a computer or telecommunications local or wide area network.

In one preferred embodiment, the network or mechanism to be controlled is a traffic control system for vehicles, aircraft, or other means of freight of passenger transportation.

In one embodiment the invention controls the arrivals of the perishable inventory.

In another embodiment the invention controls the arrivals of repairable items to service facilities.

These and other and further objects of the invention are apparent in the disclosure, which includes the above and ongoing specification including the appended claims, and which also includes the drawings.

BRIEF DESCRIPTION OF THE DRAWINGS

FIG. 4 is a schematic representation of a call origination system.

FIG. 5 is a plot of the frequency distribution of durations of service typically found in, for example, a call origination system.

FIG. 6 is a flow chart of a system for regulating arrivals in a call origination system.

DETAILED DESCRIPTION OF THE DRAWINGS

Figure 1:
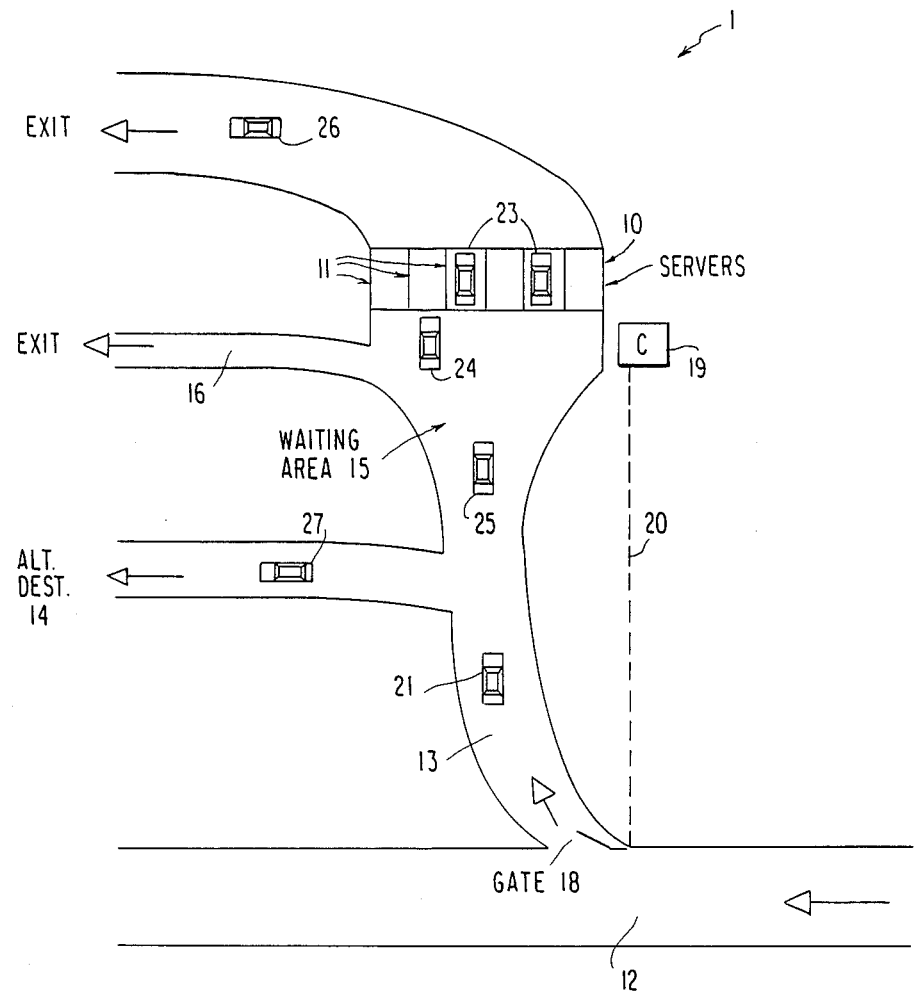
FIG. 1 is a schematic representation of an "open" system for regulating arrivals, in which customers leave the system after service.

FIG. 1 illustrates, in simplest form, a system 1 for regulating arrivals to servers. The figure shows a service facility 10, with multiple drive-through servers 11 such as bank tellers, located some distance from a main road 12 via a service road 13. There is also an alternate destination 14 reachable from the service road, and some proportion of the vehicles 21 which turn from the main road to the service road will, therefore, not be proceeding to the servers. There is a waiting area 15 of finite capacity in front of the servers, and if an arriving vehicle cannot fit in the waiting area, it proceeds directly to the overflow exit lane 16, located near the servers, and exits from the area. Also, some drivers can be assumed to be impatient and to exit, via the overflow lane, when they have waited for some time interval before starting service.

In this drawing, as an example of a typical state of the system, customer 21 has just arrived into the system, customers 23 are in service, customer 24 is about to enter service, customer 25 is entering the waiting area, customer 26 has completed service and is leaving the system, and customer 27 is proceeding to the alternate destination.

Finally, the system has a gate 18 at the turn-off point from the main road to the service road, which can be closed or opened by a controller 19 located next to the servers. This controller can see only the servers and the waiting area: that is, the controller knows how many servers are busy, how long they have been serving their current customers, all sorts of statistics on past service times and rates of arrival, how long a car takes to get from the gate to the servers, how many cars are waiting, what proportion of cars which turn on to the service road have proceeded to the alternate destination, and so on. The controller does not know, however, where given cars are going when they turn onto the service road. The controller's control strategies, therefore, consist of rules for opening and closing the gate, which is operated via control link 20.

FIG. 1 applies to open systems or networks: customers (cars) enter the system at random, pass through one of the routes, and exit the system. The control methods discussed for this situation also apply, however, to a closed (recirculating) system, as illustrated in FIG. 2.

Figure 2:
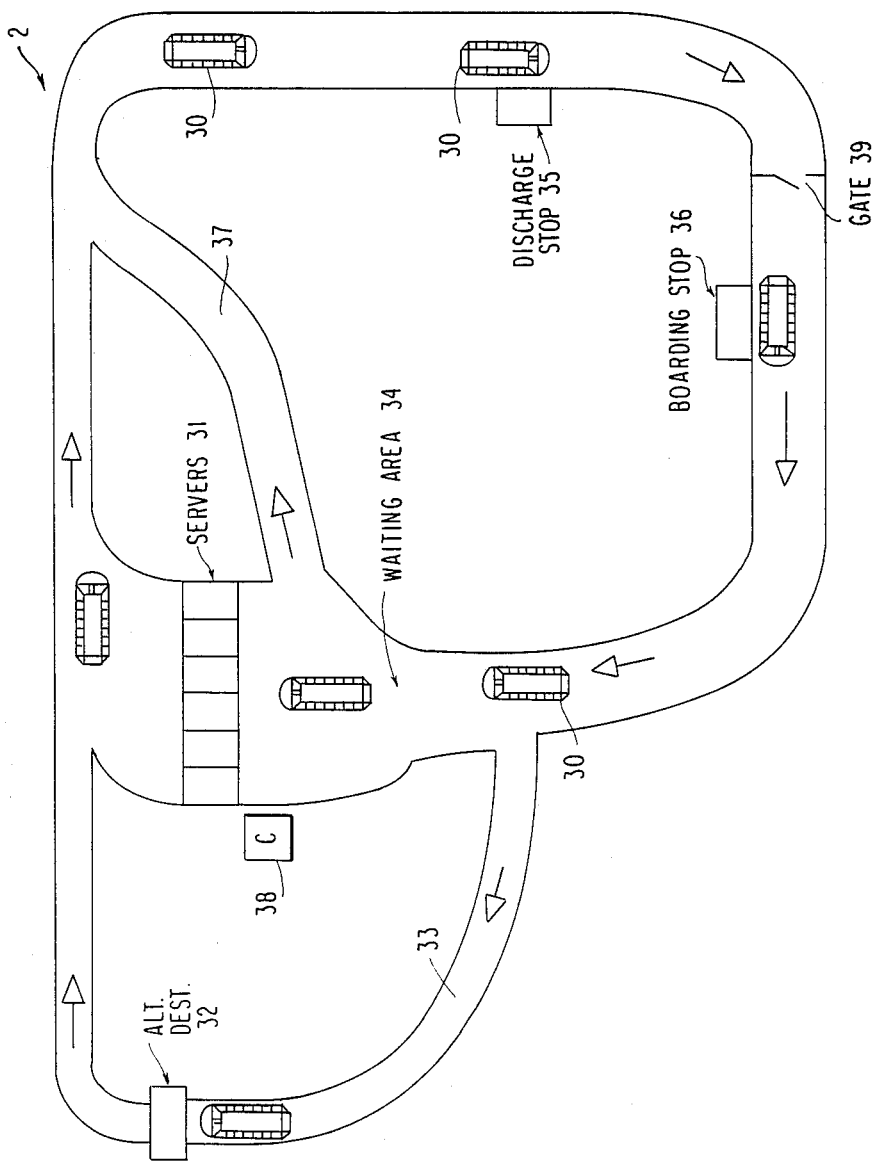
FIG. 2 is a schematic representation of a "closed" system for regulating arrivals, in which customers recirculate through the system.

FIG. 2 shows a system 2 in which a fixed number of buses 30 circulate between two destinations, service facility 31 and alternate attraction 32, and pick-up point 36 and discharge point 35 for visitors to those destinations. A group of visitors boarding a bus may elect to proceed either to the service area 31 or to the alternate attraction 32. Again, there is a finite waiting area 34 in front of the service area, and buses which arrive to find a full waiting area simply return to the discharge stop 35 via exit lane 37. Also, buses which have waited more than a specified time interval without entering the service area return to the discharge stop via the exit lane. Buses which go to the alternate attraction 32 spend some time there (the time spent can be either a fixed quantity or a random variable) and then return to the discharge stop 35. The controller 38 regulates arrivals by opening and closing the gate 39 between the discharge and boarding stops; buses which approach the gate when it is closed simply wait there until it opens.

These two figures illustrate, in simple form, the general open and closed queueing network representations of server systems with arrival metering. Cars or buses are "customers" and the controller chooses among various control strategies, depending on the relative importance of (1) keeping servers busy, (2) serving as many customers as possible, and (3) turning away from service, once they are admitted through the gate, as few customers as possible. The first two objectives generally lead the controller to want to increase the number of customers admitted to the system, while the third objective leads the controller to want to slow the admissions, admitting customers only when servers are fairly sure to be available. Also, having some room rather than none in the waiting area allows the controller more flexibility to increase the number of customers admitted (improving performance on objectives 1 and 2) without turning away many more customers (objective 3), since the arrivals can slightly precede service completions without causing a customer to be turned away. In the closed type of system (FIG. 2), however, when there is substantial waiting room in front of the service area , admitting more customers in some circumstances *decreases* customer throughput (the second objective) because the limited number of buses spend more time waiting and are not available to pick up new passengers.

The call origination management system (preferred embodiment described in detail) is a closed network as in FIG. 2, wherein "buses" are telephone lines, "passengers" are answering patrons, the "alternate destination" is call results other than answer, "servers" are operators, the "waiting area" is a hold message, and the "gate" is the decision to dial a telephone line.

For inbound telephone systems, telephone routing, and computer message networks, the "main road" is the stream of incoming calls or messages, and the "gate" is the decision to route calls or messages to an alternate facility or processor which is more costly, or otherwise less desirable, than the one represented by the "servers." The "alternate destination" (after passing through the gate) is any call outcome which does not require the use of the servers—a processor-only request, for example, in a computer network, where the "servers" in the figure are input/output devices.

Figure 3:
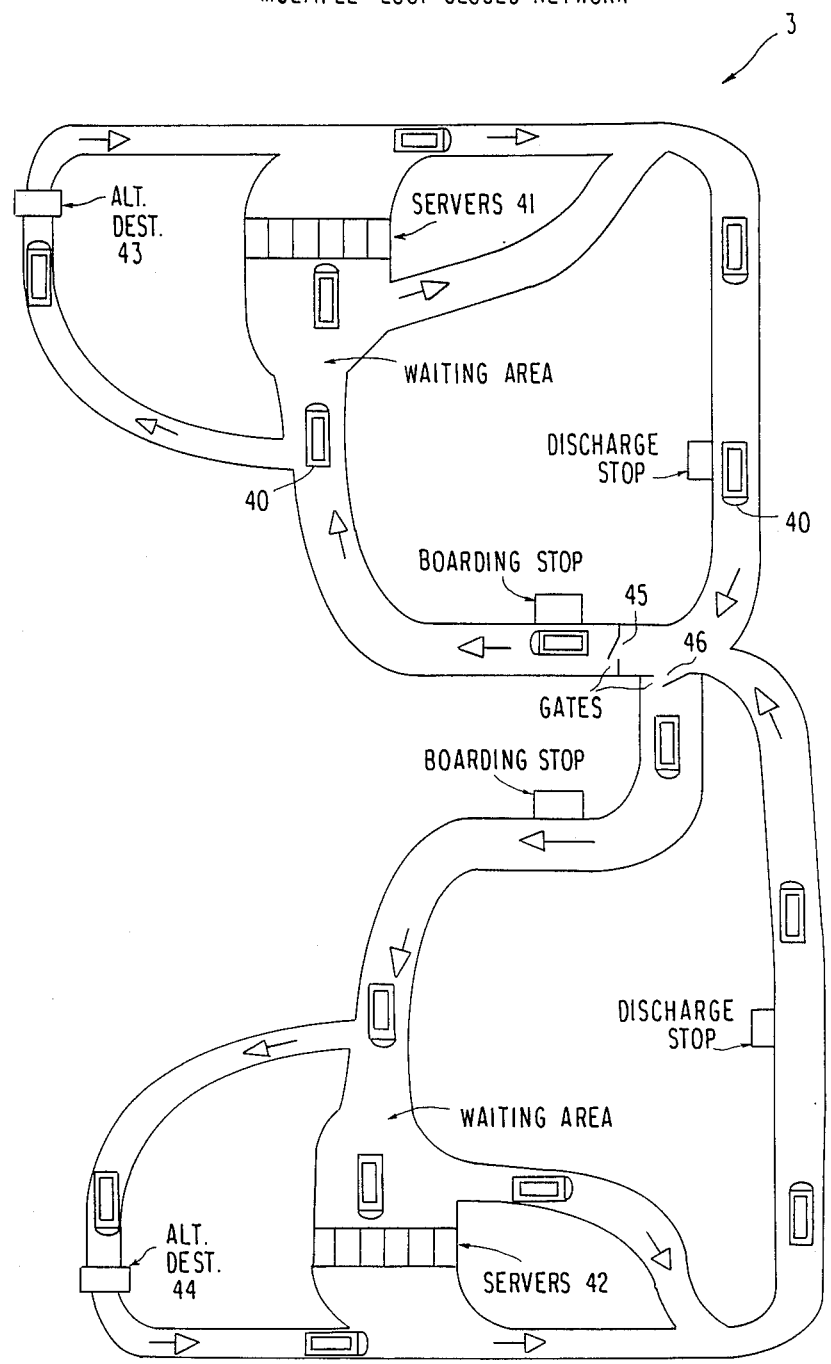
FIG. 3 is a schematic representation of another "closed" system for regulating arrivals, in which there are two subsystems, each of which is like the system in FIG. 2.

FIG. 3 illustrates the extension of the closed type of system 3 to two sets of servers 41 and 42. Corresponding to service facilities 41 and 42 are alternate destinations 43 and 44, respectively. In this case, a pair of gates 45 and 46 controls the assignment of buses 40 to one direction or the other, where each direction is a system including servers, waiting, boarding, discharging, and alternate destination as in FIG. 2. The representation generalizes further to three or more directions (subsystems). This figure illustrates the call origination system with multiple campaigns, wherein telephone lines can be reassigned from one campaign to another depending on the processing and congestion of the campaigns. This figure also illustrates the inbound communications routing system, wherein telephone lines can be reassigned from one set of answering operators to another depending on processing and congestion. The present invention also controls reassignment of servers, which in this figure means simply reducing by one the number of servers in one subsystem and increasing by one the number of servers in another subsystem.

FIG. 4 illustrates a preferred embodiment, a call origination system 4, incorporating the control system of this invention. Line control unit 50 receives telephone numbers from processor 52, generates dial tones or pulses, and identifies the response as answer, no answer, busy, telephone company message, or other call results. Answering patrons are connected to operators' station headsets 56 while the processor simultaneously displays information about the answering patron on operators' station computer terminals 58, each of which corresponds to a headset. Controller 54, which may be included in line control unit 50 or processor 52 or independent from both, records times when patrons are connected to operators, durations of service (connects to operators), transit time from dialing to start of service, proportion of dialing starts which result in answers, and other relevant statistics. Controller 54 regulates new dialing starts using the system which is the subject of this invention.

FIG. 5 illustrates the frequency distribution of durations of service when there are two classes of customers with different service requirements. For example, in the call origination system, often a call is intended for only one member of a household; if that person is not at home, the operator simply leaves a message or solicits information about when to call back. In this case, connects consist of "good" and "bad" contacts, the former typically having connect times of 1.5 to 3 minutes and the latter having connect times of 20 to 40 seconds. Note that the overall average service time, in this situation, is a poor estimate of the duration of service, since the actual time is rarely equal or close to the overall average. This is why collecting and using information about "long" and "short" durations of service to predict duration of service, as described in the summary of the invention, often results in a substantial improvement over using just the average duration of service.

FIG. 6 illustrates the control steps 100 for a call origination system. As lines become available to dial, the decision subsystem 110 (shown in detail in FIG. 7) is invoked to determine whether one or more lines should be dialed immediately; those lines which are not dialed immediately wait until a decision to dial is made, in a subsequent call to the decision subsystem 110. When a line is dialed 112, the time at the start of dialing is recorded 113, and the call origination system recognizes 114 the call progress and responses on the line. When a condition other than answer is detected 116, a counter 118 of number of call attempts is incremented, and the line is made available to dial again (returned to the wait condition 120 controlled by the decision routine.)

When an answer is detected 116, the current time is recorded 122, and the transit time (interval from the time at start of dialing to the current time) is measured 124 and added to a counter. If a server (operator) is free 126, the call is connected immediately to that server; otherwise, the call is placed in a hold queue 128, to be connected to a server as soon as one is available. When an answering patron is connected to a server 130, the time is recorded 132; when service is completed, the current time is recorded 134, and the interval from start of service (connection to a server) to completion of service is measured 136 and added 138 to a counter. The time interval is, in addition, compared to a register containing the minimum duration of service; if the time interval is less than the register value, it replaces the register value. Similarly, the time interval is compared 138 to another register containing the maximum duration of service; if the time interval is greater than the register value, it replaces the register value. The square of the time interval is added 138 to another counter.

The system now checks 140 to determine whether a specified time interval (ten minutes, in a preferred system) and a specified number of service completions (fifty, in a preferred system) have elapsed. If so, an update subsystem 150 is invoked, and the system 100 is updated 150. In either case, the system then returns the line to the wait state 120, available for another dialing attempt.

Figure 7:
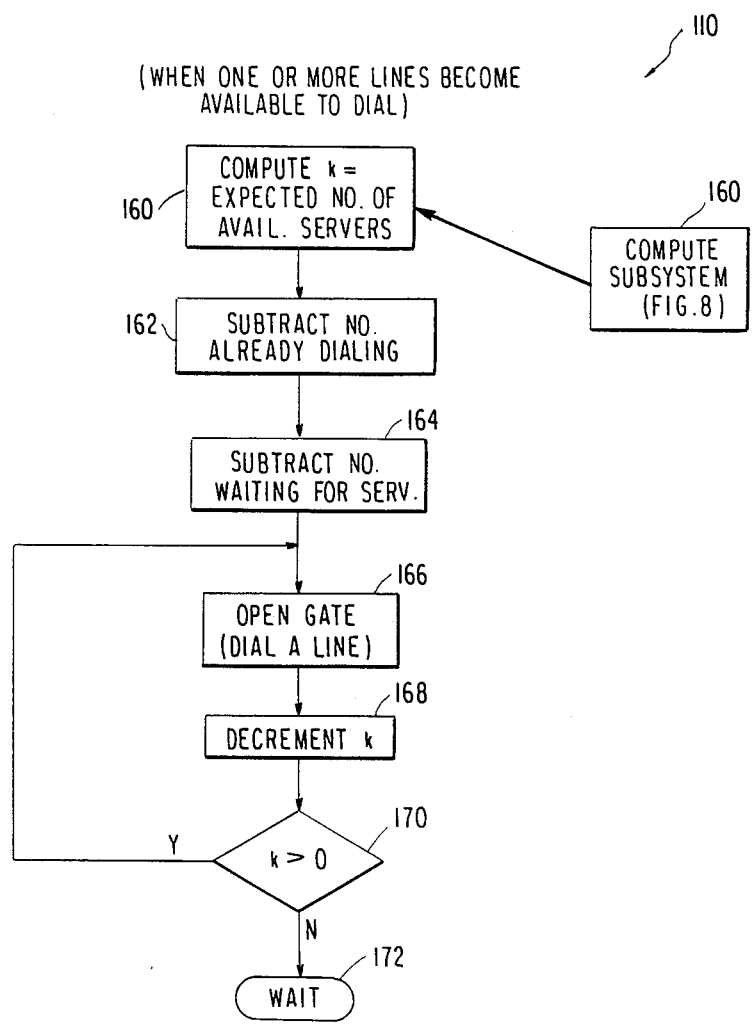
FIG. 7 is a flow chart of a decision subsystem, part of the system depicted in FIG. 6, for regulating arrivals in a call origination system.

The steps in the decision subsystem 110, which is invoked to determine whether to dial lines which have become available to dial, are shown in FIG. 7. The system 110 first invokes the compute subsystem 160 (shown in detail in FIG. 8) to determine the number, k, of servers expected to be available by the time a dialing attempt could result in an answer. From this number the system subtracts 162 the number of lines already dialing and subtracts 164 the number of calls on hold awaiting a server. The system then 166 dials k lines or, in another preferred embodiment, k/p lines, where p is the proportion of attempts which result in answer (computed in the update routine.) The system then 168 decrements k until k=0, the comparison 170 being repeated until equality holds, and then returns to wait status 120.

Figure 8:
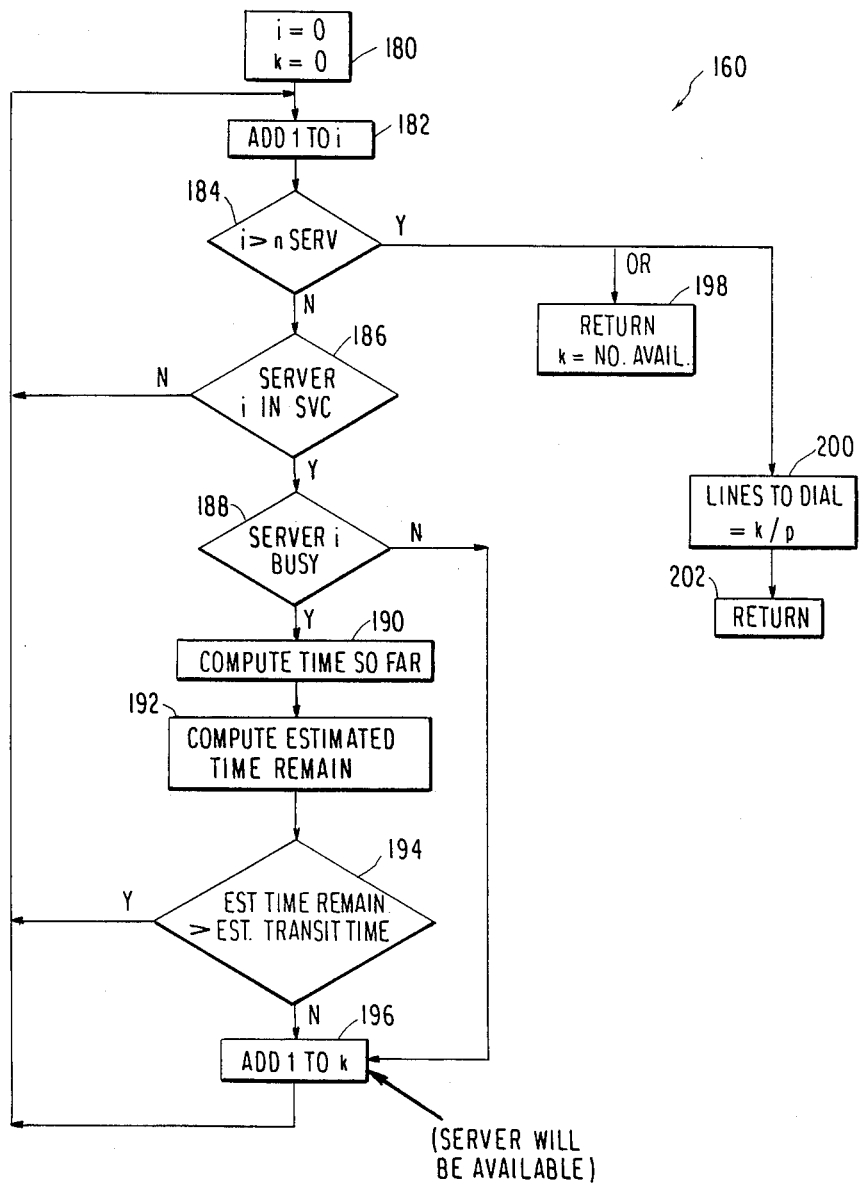
FIG. 8 is a flow chart of a compute subsystem, part of the system depicted in FIG. 6, for updating performance measures used by the decision system depicted in FIG. 7.

The compute subsystem 160, shown in FIG. 8, utilizes index counter i to check, for all service stations available to the system, the availability of the i-th server. The counter i and the counter k are first initialized 180 to zero; then i is incremented 182 and the i-th server is checked. If the server is out of service 186 (being repaired, on a break, or not logged onto the computer, for example), the system proceeds to check the next server (returns to increment i, step 182). If the server is in service, the system next checks 188 whether the server is currently busy. If not, the system proceeds 196 to add 1 to k, the count of servers expected to be available, and proceeds to check 182 the next server.

If the server is currently busy 188, the system checks the current time and compares it to the time the current service began, to obtain 190 time in service so far. The system then computes 192 the expected duration of service, by one of several methods: (1) minimum service time, which was stored in a register earlier; (2) maximum service time; (3) average service time; (4) compare time in service so far against register which contains boundary value dividing "long" from "short" services, then use average "long" service time as expected duration if time so far is greater than the register, or use average "short" service time if time so far is less than or equal to the register; or (5) other methods explained in the disclosure. The system subtracts time in service so far from the expected duration of service to obtain 192 expected time remaining in service.

The system then compares 194 expected time remaining in service to a register containing expected transit time, that is, the average time from start of dialing to answer for answered calls. If the expected time remaining in service is less than or equal to the expected transit time, the counter k is incremented 196, indicating that this server is expected to be available by the time a dialing attempt started at this time could result in an answer. The system then proceeds 182 to check the next server.

When index i reaches a value greater than nserv, the maximum number of servers the system can have, as determined by compare step 184, the subsystem returns 198 the value k, the number of servers expected to be available, to the decision routine. In another preferred embodiment, the system has computed the proportion p of dialing attempts which result in answer (i.e. number of service initiations divided by number of arrivals initiated, as explained in the summary of the invention). In this case, the compute subsystem divides 200 the value k by proportion p, stored in a register by the update subsystem, to obtain the number of lines to dial (arrival processes to initiate), and then returns 202 to the main decision system.

The update subsystem 150 revises and stores in registers the current values of average transit time, average duration of service, minimum duration of service, maximum duration of service, proportion p of dialing attempts which result in answer, standard deviation of duration of service, and so on. Means (averages) are computed by dividing the total in a counter (such as the counter to which durations of service were added whenever a service completed) by the counter containing the number of services (which was incremented by 1 whenever a service was completed. Standard deviation is computed by dividing the counter containing the sum of squared durations of service by the number of services; subtracting from this result the square of the average duration of service; and taking the square root of the result thus obtained.

For systems which classify services into "long" and "short," separate counters for number, sum of durations, and sum of squared durations are maintained for "long" and "short" services, which are classified at the end of service according to the boundary time as of the last update. The mean and standard deviation of "long" and "short" service times are then computed by the update routine, as described in the preceding paragraph. The boundary, which is generally defined in terms of means and standard deviations of "long" and "short" service times, is then updated as well, using the values just completed.

While the invention has been described with reference to specific preferred embodiments, modifications and variations may be constructed and used without departing from the scope of the invention, which is defined in the following claims.

I claim:

1. A method for controlling arrivals of customers to servers wherein customers are queued to await service by said servers, comprising the steps of:
    measuring durations of customer service;
    computing and updating time statistics of services to customers, thereby estimating expected duration of customer service;
    recording starting time of each current customer service and noting present time;
    comparing present time to starting time, and thereby determining time in progress for each customer service;
    comparing time in progress to expected duration of service, and estimating time remaining in service for each customer currently in service;
    determining a number of currently busy servers expected to be available by the time another customer arrival could reach the currently busy servers;
    measuring the number of available servers not currently serving a customer;
    adding the number of currently available servers and the number of currently busy servers expected to be available, thereby computing total number of servers expected to be available;
    subtracting the number of customer arrivals currently queued awaiting service thereby producing a resultant number of servers expected to be available; and
    controlling a processor which regulates customer arrivals to correspond to the resultant number of servers expected to be available.

2. The method of claim 1, further comprising the steps of:
    measuring a ratio of number of service initiations to numbers of customer arrivals;
    calculating the number of service initiations by dividing the total number of servers expected to be available by said ratio during a selected time interval of recent operation.

3. The method of claim 2, wherein the step of calculating comprises the steps of:
    computing a weighted average of the total number of servers expected to be available; and
    calculating with that weighted average the number of arrivals being initiated by the processor which regulates customer arrivals.

4. The method of claim 1, wherein the step of computing and updating time statistics comprises the steps of:
    classifying service times as short or long;
    measuring mean, minimum, and maximum of short service times; and
    measuring mean, minimum, and maximum of long service times.

5. The method of claim 4, wherein the comparing of time in progress to the expected duration of service comprises comparing the time in progress to a measured minimum time of service during a selected recent time interval of operation.

6. The method of claim 4, wherein the comparing of time in progress to the expected duration of service comprises comparing the time in progress to a measured maximum time of service during a selected recent time interval of operation.

7. The method of claim 4 wherein the comparing of time in progress to the expected duration of service comprises comparing the time in progress to a measured mean (average) of times of service during a selected recent time interval of operation.

8. The method of claim 4 wherein the step of comparing time in progress to expected duration of service comprises the steps of:
    computing an estimated boundary between long and short services;
    classifying services which have been in progress longer than said estimated boundary as long services, and classifying other services in progress as short services; and
    using the estimated duration of long services as the expected duration of service for services currently in progress which are classified as long services, and using the estimated duration of short services as the expected duration of service for services currently in progress which are classified as short services.

9. The method of claim 8 wherein the step of computing an estimated boundary further comprises calculating a weighted average of the means of the short and long service times and using the weighted average as the estimated boundary between long and short service times.

10. The method of claim 8 wherein the step of computing the estimated boundary further comprises calculating a weighted average of the maximum duration of short services and the minimum duration of long services and using said weighted average as the estimated boundary between long and short services.

11. The method of claim 8 wherein the step of computing the estimated boundary further comprises using the mean duration of short services plus s standard deviations of the durations of short services as the estimated boundary between long and short service times, where s is any positive number.

12. The method of claim 8 wherein the step of computing the estimated boundary further comprises using the mean duration of long services minus t standard deviations of the durations of long services as the estimated boundary between long and short service times, where t is any positive number.

13. The method of claim 4 wherein the step of classifying comprises the steps of:
    using the measured mean of the short service times as an estimated duration of short services; and
    using the measured mean of the long service times as an estimated duration of long services.

14. The method of claim 4 wherein the step of classifying comprises using the minimum duration of short services as the estimated duration of short services.

15. The method of claim 4 wherein the step of classifying comprises using the maximum duration of short services as the estimated duration of short services.

16. The method of claim 1, wherein customers may return to servers for subsequent stages of service, further comprising counting the number of customers having completed service but available (still within the system) to return to a subsequent stage of service, and subtracting the number of customers having completed service but expected to return to a subsequent stage of service from the total number of servers expected to be available, to regulate arrivals so as to ensure availability of servers for customers returning to service.

17. The method of claim 16, further comprising computing the estimated proportion of customers having completed one stage of service who are expected to return for subsequent service, and subtracting said estimated proportion, rather than the total number of customers having completed service and available to return to a subsequent stage of service, from the total number of servers expected to be available, to regulate arrivals.

18. The method of claim 1, further adjusting automatically to provide a specified proportion, q, of arrivals for which no server is available, comprising the steps of:
computing a quantile such that the proportion qn of service times less than said quantile is equal to the pre-selected proportion q; and
using the said quantile as the estimate of duration of service.

19. The method of claim 18, further iteratively adjusting expected duration of service, d, to maintain a preselected proportion q of arrivals for which no server is available, comprising the steps of:
using a statistic of service times as an initial estimate, $d=d_1$, of the duration of service;
decreasing d to $d_2=0.9d_1$ if the resulting proportion $q_1$ of arrivals for which no server is available is higher than q;
increasing d to $d_2=1.1d_1$ if the resulting proportion of arrivals $q_1$ for which no server is available is lower than q, and
computing $d_np_1 = d_n + (q-q_n)(d_n - d_nm_1)/(q_n - q_nm_1)$ at each step where $d_np_1$ is the new calculated d, $d_n$ is the most recently used estimate of d, $d_nm_1$ is the next most recently used estimate of d, $q_n$ is the proportion of arrivals for which no server was available when $d_n$ was used as the estimate of d, and $q_nm_1$ is the proportion of arrivals for which no server was available when $d_nm_1$ was used as the estimate of d.

20. The method of claim 1 wherein the step of determining a number of currently busy servers expected to be available comprises the steps of:
measuring times from the point of initiating arrivals to start of service and thereby estimating expected transit times; and
comparing said transit times to estimated time remaining in service for the currently busy servers.

* * * * *